United States Patent
Fox et al.

(10) Patent No.: US 11,025,375 B2
(45) Date of Patent: Jun. 1, 2021

(54) MITIGATING SENSOR DATA LOSS

(71) Applicant: INTERNATIONAL BUSINESS MACHINES CORPORATION, Armonk, NY (US)

(72) Inventors: Jeremy R. Fox, Georgetown, TX (US); Trudy L. Hewitt, Cary, NC (US); Liam S. Harpur, Skerries (IE); John Rice, West Pennant Hills (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/502,507

(22) Filed: Jul. 3, 2019

(65) Prior Publication Data
US 2021/0006368 A1    Jan. 7, 2021

(51) Int. Cl.
*H04L 1/22* (2006.01)
*H04L 1/18* (2006.01)
*H04L 29/08* (2006.01)

(52) U.S. Cl.
CPC .............. *H04L 1/22* (2013.01); *H04L 1/189* (2013.01); *H04L 67/12* (2013.01)

(58) Field of Classification Search
CPC ......... H04L 9/3247; H04L 67/10; G06T 7/73; G06F 19/00; H04W 4/00; H04W 4/08; G06Q 10/083
See application file for complete search history.

(56) References Cited

U.S. PATENT DOCUMENTS

| | | | |
|---|---|---|---|
| 6,499,114 B1 | 12/2002 | Almstead et al. | |
| 81,440,282 | 3/2012 | Lamothe et al. | |
| 8,913,747 B2 | 12/2014 | Montenegro | |
| 9,807,575 B2 * | 10/2017 | Smadi ................ | H04W 4/023 |

(Continued)

FOREIGN PATENT DOCUMENTS

WO    2017044153 A9    12/2017

OTHER PUBLICATIONS

"IBM MaaS360 with Watson—Unified Endpoint Management (UEM)," [online] IBM Corporation, [retrieved Jul. 2, 2019], retrieved from the Internet: <https://www.ibm.com/security/mobile/maas360>, 1 pg.

(Continued)

*Primary Examiner* — Iqbal Zaidi
(74) *Attorney, Agent, or Firm* — Cuenot, Forsythe & Kim, LLC

(57) ABSTRACT

Mitigating the risk of sensor data loss can include establishing, with a computing node, a first communication channel with a first proximate device and a second communication channel with a second proximate device. The first proximate device can be operatively coupled to a sensor and can generate data in response to signals received from the sensor. The computing node can receive the data generated by the first proximate device. The data can be received from the second proximate device via the second communication channel in response to detecting a failure to receive a complete uncorrupted transmission of the data from the first proximate device via the first communication channel and determining that the second proximate device is capable of receiving and retransmitting the data to the computing node.

20 Claims, 10 Drawing Sheets

(56) References Cited

U.S. PATENT DOCUMENTS

| | | |
|---|---|---|
| 2008/0052356 A1 | 2/2008 | Johnson et al. |
| 2011/0215924 A1 | 9/2011 | Kolblin et al. |
| 2014/0279596 A1* | 9/2014 | Waris .................. G06Q 10/0833 |
| | | 705/317 |
| 2014/0280316 A1 | 9/2014 | Ganick et al. |
| 2017/0090467 A1 | 3/2017 | Cincea et al. |
| 2018/0268375 A1* | 9/2018 | Passila .................. G06F 15/177 |

OTHER PUBLICATIONS

Bangerter et al. "Networks and devices for the 5G era." IEEE Communications Magazine 52.2 (2014): 90-96.

Lee et al., "Design of active semantic middleware system to support incomplete sensor information based on ubiquitous sensor network." 2010 4th International Conference on Application of Information and Communication Technologies. IEEE, 2010, 5 pg.

Rault et al. "A survey of energy-efficient context recognition systems using wearable sensors for healthcare applications." Pervasive and Mobile Computing 37 (2017): 23-44.

Van De Ven et al. "Integration of a suite of sensors in a wireless health sensor platform." Sensors, 2009 IEEE. IEEE, 2009, 6 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

MITIGATING SENSOR DATA LOSS

BACKGROUND

The present disclosure relates to the field of wireless communications, and more particularly, to wireless communication of sensor data.

Sensors are increasingly used to monitor and measure the conditions and functioning of systems (e.g., appliance automation systems, security systems, entertainment systems and the like) within buildings, homes, and surrounding areas. For example, multiple sensors can monitor and measure parameters related to the functioning of a home automation system for remotely controlling various devices connected to a central hub or gateway using a wall-mounted terminal, tablet, desktop computer, or smart phone. Network devices connected via the Internet are a component of the Internet of Things (IoT).

A social sensors service can collect and compile multi-sourced data to derive knowledge on how an environment of networked devices is operating. The derivation can be based, for example, on pattern analysis or similar statistically based systems. The service can collect, anonymize, and compile data collected from multiple individual users' systems so as to calculate average values for select parameters and allow comparisons between individual users' systems and the average values.

SUMMARY

In one or more embodiments, a method includes establishing, with a computing node, a first communication channel with a first proximate device and a second communication channel with a second proximate device. The first proximate device can operatively couple to a sensor. The method also can include receiving, at the computing node, data generated by the first proximate device based on a signal emitted by the sensor. The data is received from the second proximate device via the second communication channel in response to detecting a failure to receive via the first communication channel a complete uncorrupted transmission of the data from the first proximate device and determining that the second proximate device is capable of receiving and retransmitting the data to the computing node.

In one or more embodiments, a system includes a processor configured to initiate operations. The operations include establishing a first communication channel between a computing node and a first proximate device, the first proximate device operatively coupled to a sensor. The operations also include receiving, at the computing node, data generated by the first proximate device based on a signal emitted by the sensor. The data is received from a second proximate device via a second communication channel in response to detecting a failure to receive via the first communication channel a complete uncorrupted transmission of the data from the first proximate device and determining that the second proximate device is capable of receiving and retransmitting the data to the computing node.

In one or more embodiments, a computer program product includes a computer readable storage medium having program instructions stored thereon. The program instructions are executable by a computing node to initiate operations. The operations include establishing, by the computing node, a first communication channel between the computing node and a first proximate device, the first proximate device operatively coupled to a sensor. The operations also include receiving, by the computing node, data generated by the first proximate device based on a signal emitted by the sensor. The data is received from a second proximate device via a second communication channel in response to detecting a failure to receive via the first communication channel a complete uncorrupted transmission of the data from the first proximate device and determining that the second proximate device is capable of receiving and retransmitting the data to the computing node This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
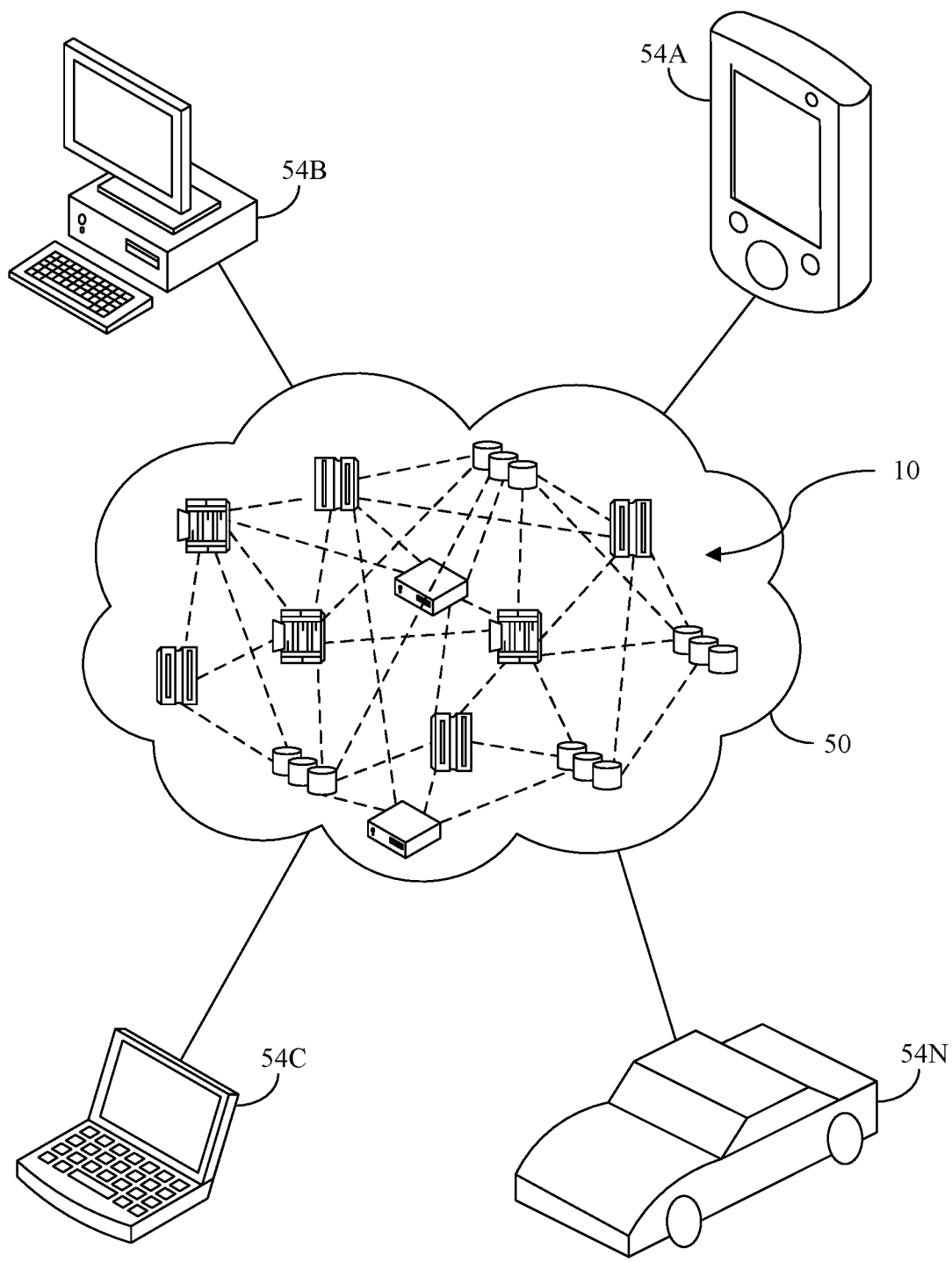
FIG. 1 depicts a cloud computing environment according to an embodiment of the present invention.

While this disclosure concludes with claims defining novel features, it is believed that the various features described within the disclosure will be better understood from a consideration of the description in conjunction with the drawings. The process(es), machine(s), manufacture(s) and any variations thereof described herein are provided for purposes of illustration. Specific structural and functional details described within the disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the field of data processing, and more particularly, to processing data collected by sensors.

The increasing interconnectedness of networks, systems, devices, and their users generates ever greater amounts of data, much of which is passed in real-time from sensors to device-monitoring systems. For performing ever-more complex tasks, sensors typically collect and pass large amounts of data to monitoring systems. With greater complexity and larger amounts of data, there is greater risk that wireless transmission of the data will be interrupted or impeded, thereby resulting in loss or corruption of the data.

A loss of sensor data due to such interruptions or lapses can be highly problematic. For example, a critical component of the IoT is data discovery and exchange. Loss of data from a sensor can impair a device or system's functionality, such as when a cooling system does not know the room temperature and thus cannot regulate temperature or a security system's sensor cannot detect an intruder. A monitoring system's ability to identify lapses in sensor data may be limited. A sensor-connected device's ability to store data locally may likewise be limited. These and similar such limitations can further increase the risk of a loss of sensor data which can impair a device or system's functionality.

In accordance with the inventive arrangements disclosed herein, the risk that wirelessly transmitted sensor data is lost or corrupted is mitigated by converting networked devices that transmit sensor data to a computing node or monitoring system into proximate devices. A proximate device, according to the inventive arrangements disclosed herein, is one that can fill the gap if a transmission channel used by one device to transmit sensor data to a computing node or monitoring system is interrupted. In response to the interruption, the device can transmit the sensor data to a proximate device, which temporarily caches the data and retransmits the data to the computing node or monitoring system over an alternative channel. The inventive arrangements disclosed herein improve the functionality of a network of devices that generate data based on signals received from one or more sensors. In particular, network functionality is improved by enhancing the reliability of the network, especially in mitigating the risk of data loss, and by providing alternative communication channels for conveying data in the event that one channel is impaired or impeded for any reason.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
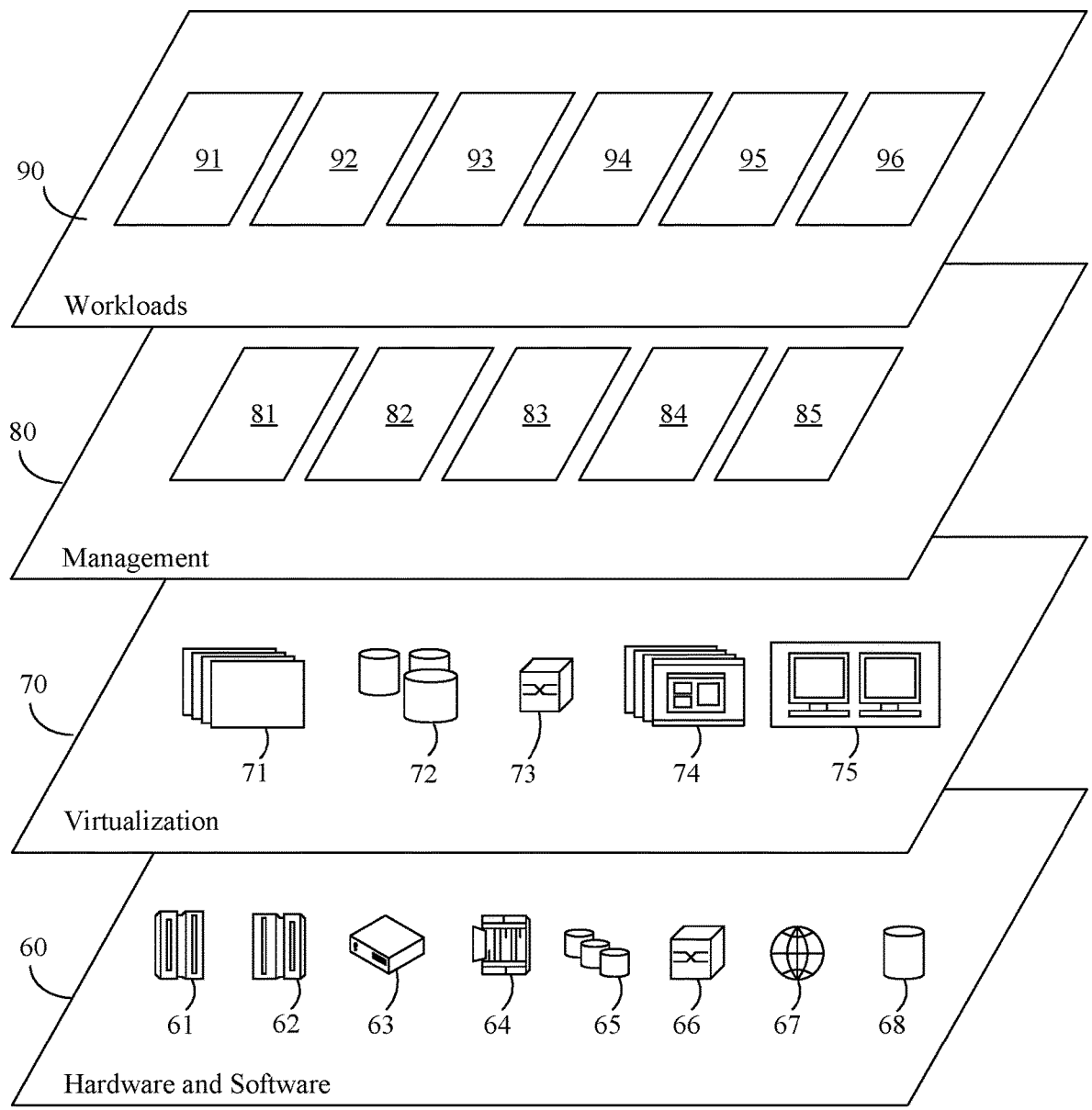
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mitigating sensor data loss 96.

In one or more embodiments, a system for mitigating sensor data loss 96 is capable of enabling multiples devices within a network of devices, each of which generates sensor data in response to signals received from one or more sensors, to act as proximate devices relative to one another. A "proximate device," as defined herein, is a networked device that (1) is within specification (e.g., satisfies network operating conditions and/or protocols); (2) is within wireless transmission range of one or more other within-specification devices; and (3) can temporarily cache and retransmit data generated by another within-specification, within-range device. Networked devices having these properties can be made proximate devices by pushing executable instructions (e.g., from a networked computing node) to the devices that enable the devices to recognize and communicate with one another as proximate devices.

The system can establish a first communication channel between a computing node and a first proximate device, the first proximate device operatively coupled to a sensor. The computing node can receive data generated by the first proximate device based on a signal emitted by the sensor. If the data is not received, or if an incomplete or corrupted transmission is received, the data instead can be received from the second proximate device. The data can be received via a second communication channel in response to detecting a failure to receive via the first communication channel a complete uncorrupted transmission of the data from the first proximate device and determining that the second proximate device is capable of receiving and retransmitting the data to the computing node. In the event that a retransmission of data from the second proximate device on behalf of the first device also fails, the process of transmit-receive-retransmit can repeat through several iterations with other proximate devices (devices within specification and within range) over alternative communication channels. By provisioning alternative communication channels using multiple proximate devices, the system enhances the network's functionality and mitigates the risk of data loss considerably. Further features of the system for mitigating sensor data loss 96 are described below in greater detail.

Figure 3:
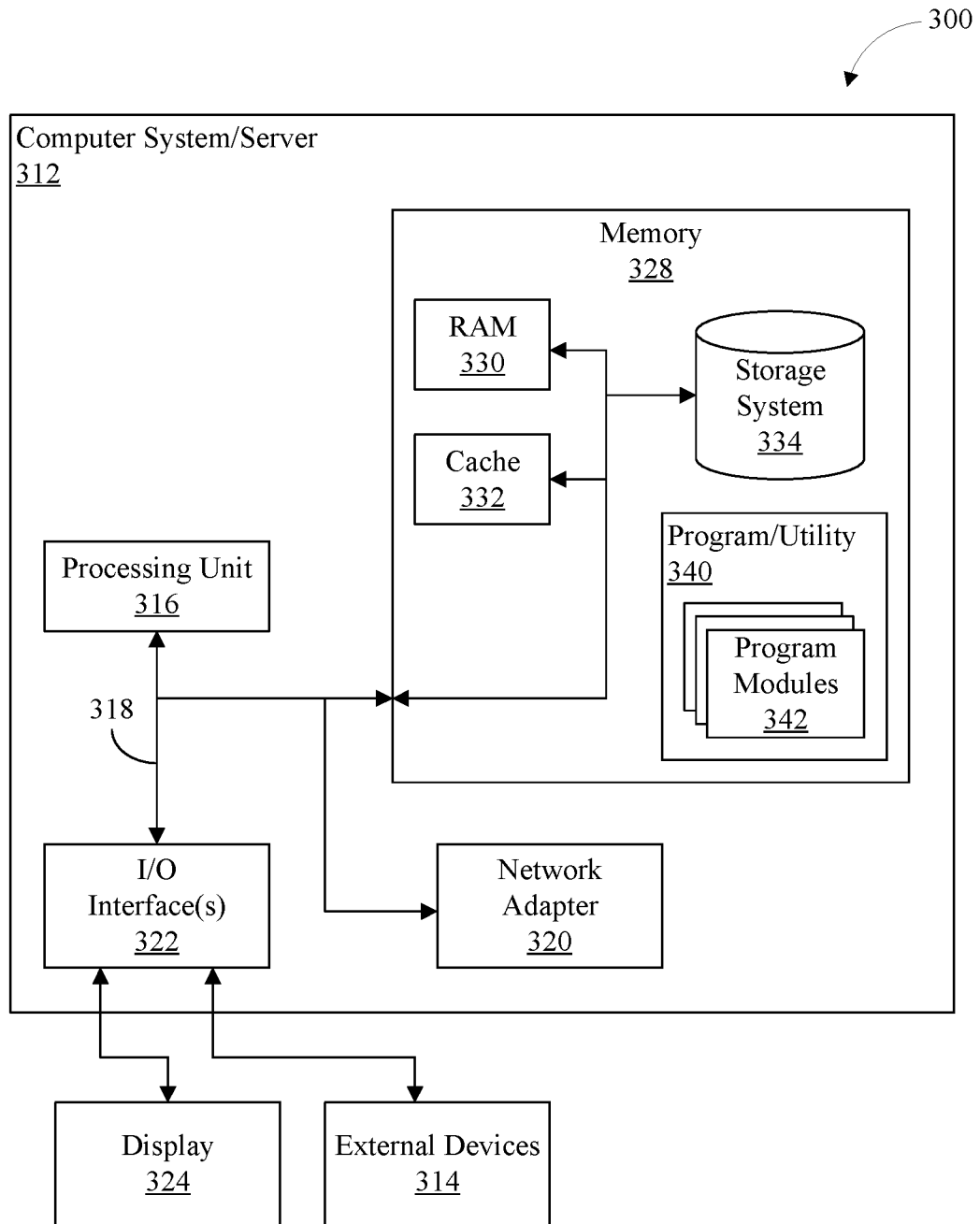
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, memory 328, and bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system for mitigating sensor data loss 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that, although not shown, other hardware and/or software components could be used in conjunction with computer system 312. Examples, include, but are not limited to microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending on the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
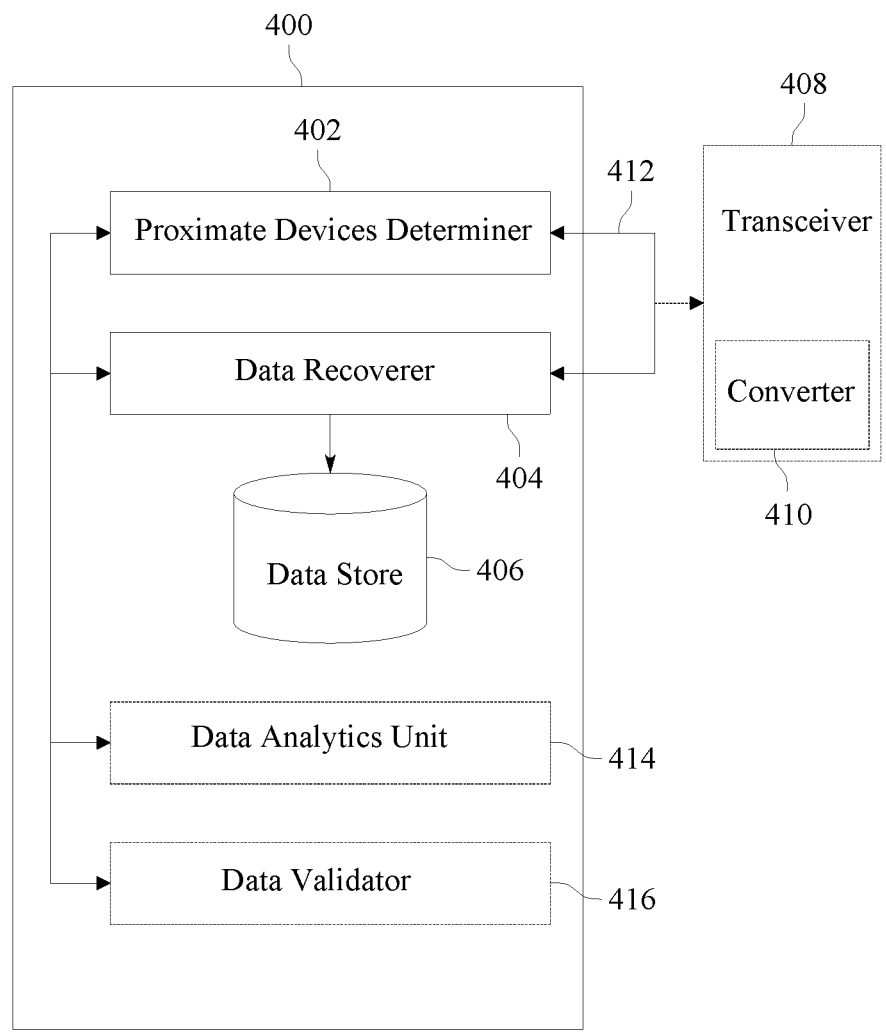
FIG. 4 depicts a system for mitigating sensor data loss according to an embodiment of the present invention.

FIG. 4 depicts system 400, which is a system similar to the system for mitigating sensor data loss 96 as described in reference to FIG. 2. System 400 illustratively includes proximate devices determiner 402, data recoverer 404, and data store 406. In one embodiment, system 400 is implemented in a computing node such as computing node 300 described in reference to FIG. 3. Accordingly, proximate devices determiner 402 and data recoverer 404 can be implemented in system-executable instructions that execute on a processor such as processor 316 of computer system 312. The computer system-executable instructions that implement proximate devices determiner 402 and data recoverer 404 can be stored in a memory such as memory 328 of computer system 312. A portion of the memory can also be allocated to data store 406. Proximate devices determiner 402 and data recoverer 404 in other embodiments can be implemented in hardwired circuitry or in a combination of hardwired circuitry and system-executable instructions.

System 400 can be implemented in a computing node communicatively coupled a network of devices. Sensors can be integrated in or operatively coupled to each of the devices. Each sensor can respond to a physical stimulus (e.g., heat, light, sound, pressure, magnetism, motion) and transmit a resulting impulse or other signal (for measurement and/or operating a controller) to the device in which it is integrated or operatively coupled. A device can be integrated in or used in conjunction with a system (e.g., building security system, home entertainment system) or other device (e.g., industrial machine, home appliance) for controlling or regulating the system or other device. The devices generate data in response to the sensor-emitted impulses and can convey the data to a computing node in which system 400 is operative or a monitor (e.g., cloud-based server/monitor) communicatively coupled to the computing node.

The computer system-executable instructions that implement system 400 can execute, for example, in a computing node that is part of a home personal network of IoT devices. System 400 instructions can execute, for example, in a computing node that is part of an enterprise-wide network of shared devices. System 400 instructions can execute, for example, in a computing node that is part of a network of industrial sensors within a manufacturing or other industrial plant, for example. System 400 instructions can execute in a computing node that is part of a network of security sensors for monitoring security, for example, at public event or similar venue. These examples only illustrate the vast array of computer node-device-sensor network arrangements in which the computer system-executable instructions that implement system 400 can execute.

Figure 5A:
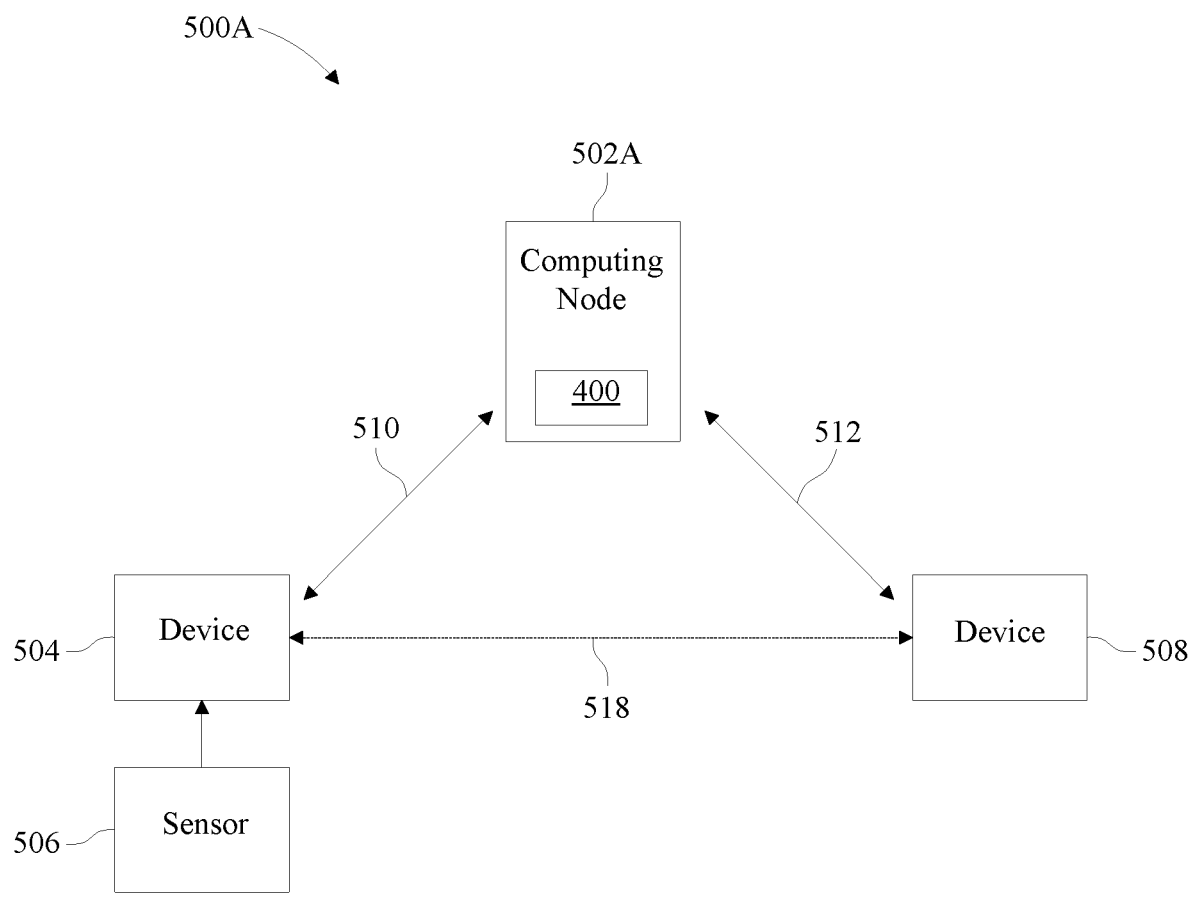
FIGS. 5A-5C depict different example network configurations in which, according to distinct embodiments, systems for mitigating sensor data losses are utilized.
Figure 5B:
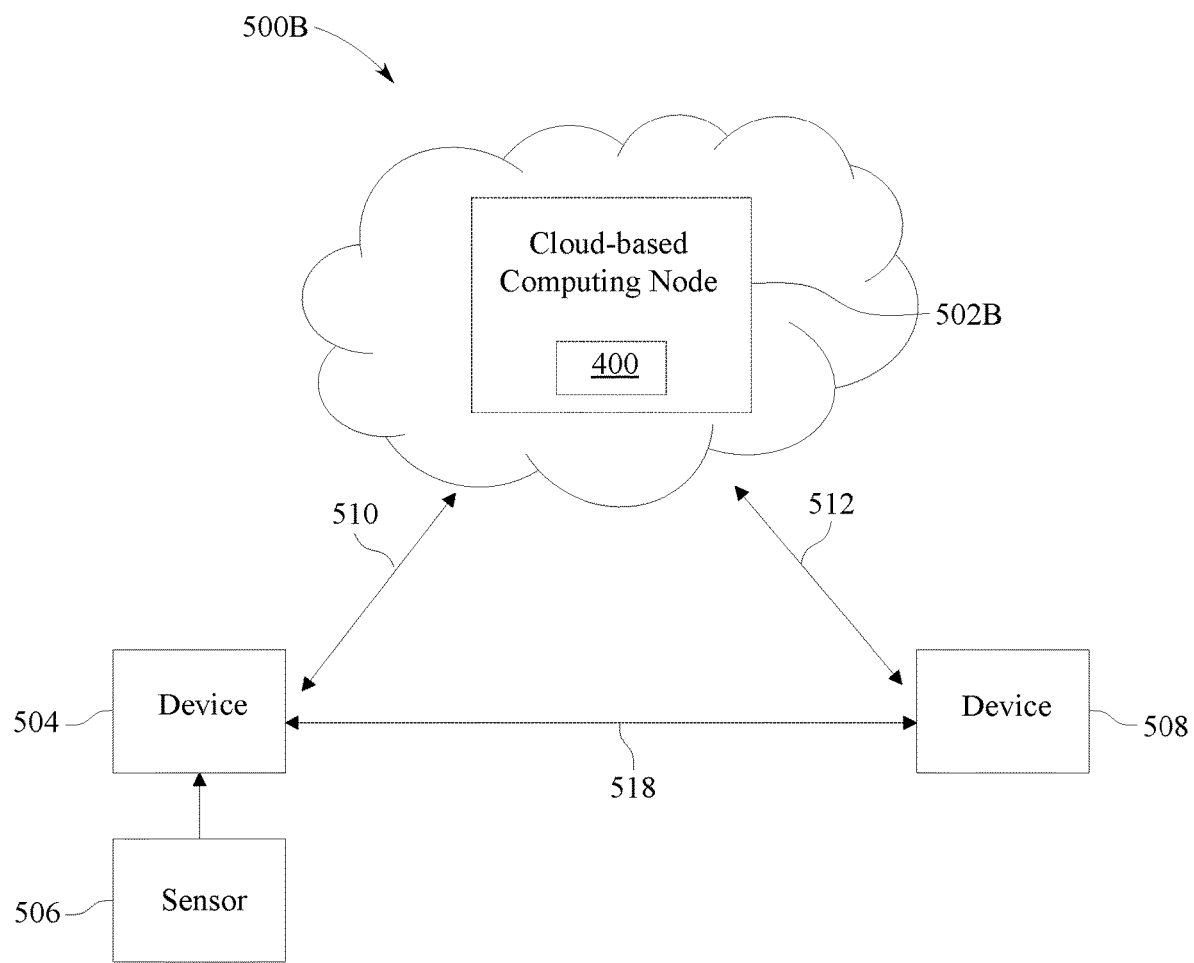
Figure 5C:
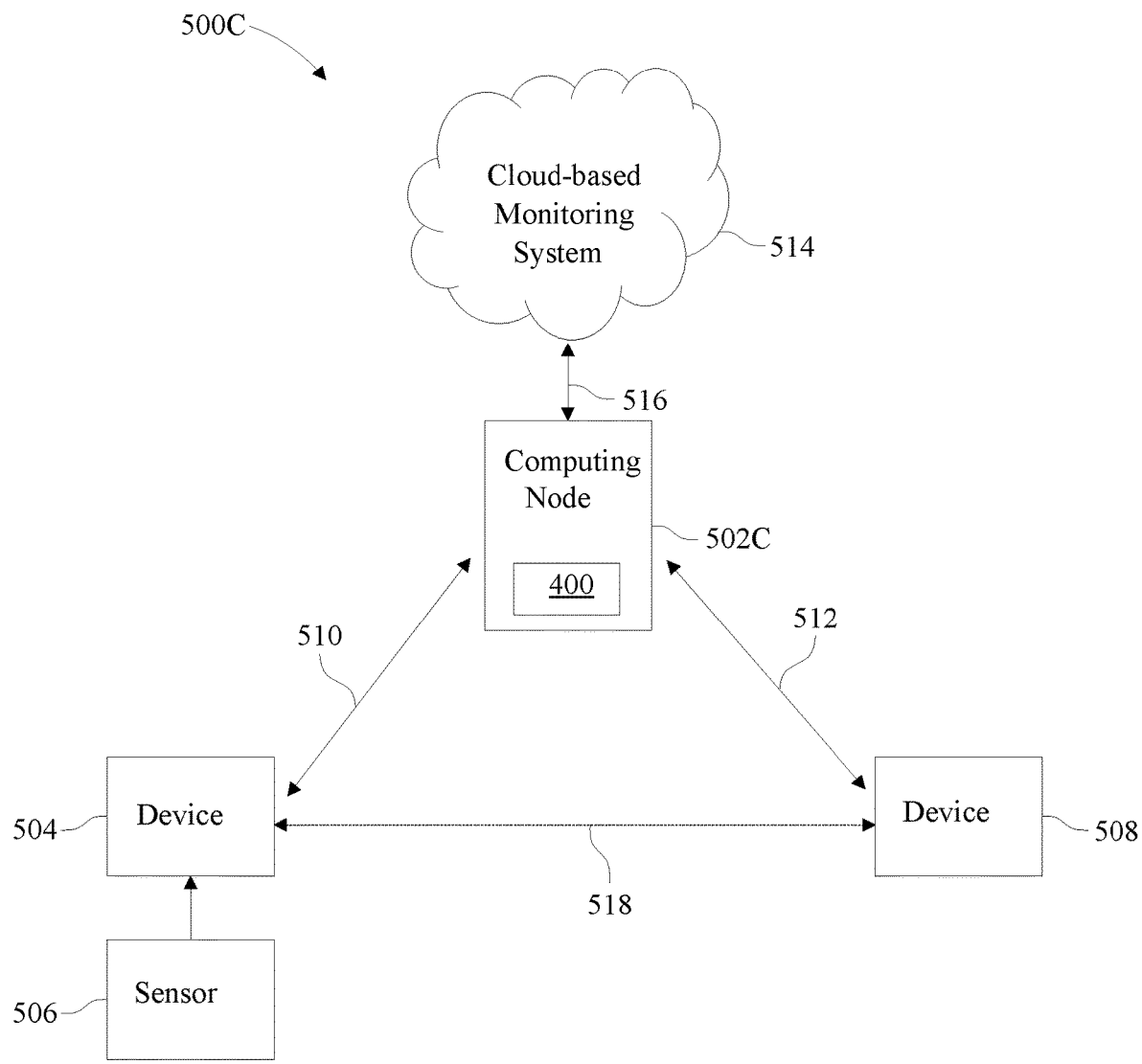

Referring additionally to FIGS. 5A-5C, examples of such computing node-device-sensor network arrangements are illustrated. In network 500A of FIG. 5A, system 400 is illustratively implemented in computing node 502A. Computing node 502A is communicatively coupled to device 504 (illustratively connected to sensor 506) and device 508 via communication channels 510 and 512, respectively. In network 500B of FIG. 5B, system 400 is illustratively implemented in cloud-based computing node 502B. Network 500B of FIG. 5B includes device 504 (illustratively connected to sensor 506) and device 508, which are coupled to cloud-based computing node 502B via communication channels 510 and 512, respectively. In network 500C of FIG. 5C, system 400 is implemented in computing node 502C, which is communicatively coupled to cloud-based monitoring system 514 via communication channel 516 and to device 504 (illustratively connected to sensor 506) and device 508 via communication channels 510 and 512, respectively. In FIG. 5C, computing node 502C implements system 400 as an interface between network connected devices 504 and 506 and cloud-based monitoring system 514.

Communication channels 510 and 512 in FIGS. 5A-5C can be wireless communication channels. Accordingly, as shown in FIG. 4, proximate devices determiner 402 and data recoverer 404 can wirelessly communicate with devices via transmitter 408, which illustratively includes converter 410 for converting wireless signals to digital data and digital data to wireless signals. Transmitter 408 can be incorporated in the computing node implementing system 400 or operate as an external device connected to the computing node via an I/O interface, such as I/O interface 322 connected to external device 314 of FIG. 3. Although two devices are shown in FIGS. 5A-5C, any number of devices can be communicatively coupled to the computing node implementing system 400.

A computing node collects data generated by different devices and serves as a repository of the data (FIGS. 5A and 5B) or conveys the data to a cloud-based monitoring system (FIG. 5C). System 400 operates to mitigate the risk that such data is lost if the computing node fails to receive a complete, uncorrupted transmission of data from a device. Operatively, according to one embodiment, proximate devices determiner 402 of system 400 can establish communication channels between devices and the computing node and can determine which of the devices have the properties necessary to act as proximate devices. Illustratively, devices 504 and 506 are proximate devices in that each (1) is within specification (e.g., satisfies network operating conditions and/or protocols); (2) is within wireless transmission range of one or more other within-specification devices; and (3) can temporarily cache and retransmit data generated by another within-specification, within-range device.

Thus, one function that proximate devices determiner 402 can perform is identifying all devices that are proximate relative to the computing node and to other devices in a network such as home personal network, enterprise-wide network, or other such network of sensor-connected devices. Devices can communicate data (generated in response to sensor-emitted signals) to the computing node via different communication channels using different protocols (e.g., SIM 3g/4g, satellite, WiFi, Bluetooth, near-field communication). Proximate devices determiner 402 can determine which devices can communicate on which channels based on a set of technical specifications and which devices can be trusted based on specified security conditions. During an initial phase, according to one embodiment, proximate devices determiner 402 can setup proximate devices on the same network based on sharing of authentication and security credentials of the devices. Proximate devices determiner 402 can convert each networked device having the above-described properties (within specification, within in range, and able to cache and retransmit data from other devices) to a proximate device by pushing executable instructions to each device. The instructions enable proximate devices to recognize and communicate with one another. In another embodiment, proximate devices determiner 402 also can supply elements needed to establish a communication path. For example, if a set of IoT devices communicate via satellite, and a mobile device is be unable to discover the IoT devices, then an appropriate plugin can be pushed to the mobile device by proximate devices determiner 402 to enable the mobile device to discover and "trust" the IoT devices.

Referring still to FIG. 4, certain operative features of a computing node that executes the system-executable instructions of system 400 are described with reference to computing node 502A in FIG. 5A. (The same operations can be performed with system 400 operating on cloud-based computing node 502B shown in FIG. 5B.) Computing node 502A can collect data generated by device 504, which generates the data in response to sensor-based signals received from sensor 506. The data can be collected by computing node 502A using communication channel 510 initially established by proximate devices determiner 402 of system 400.

In one embodiment, device 504 transmits data (generated in response to signals received from sensor 506) to computing node 502A and waits for the computing node to acknowledge receipt of the data. If no acknowledgement is received within a predetermined time period, device 504 retransmits the data via temporary channel 518 to device 508, a device identified as a proximate device (relative to device 504) by proximate devices determiner 404 and recognized as a proximate device by device 504. (Device 504 can recognize device 508 as a proximate device based on data pushed to device 504 by proximate devices determiner 508 during the initial-phase setup described above.) As a proximate device, device 508 is (1) within specification; (2) within range of device 504; and (3) capable of temporarily caching and retransmitting the data to computing node 502A. Device 508 transmits the data to computing node 502A via communication channel 512. Device 504, in response to a failure of device 508 to convey data to computing node 502A, can optionally retransmit the data to multiple other proximate devices (not shown) over different communication channels, thereby increasing the chances that the data can be successfully conveyed to the computing node by at least one proximate device. For example, if device 504 transmits data to a proximate device, but does not received an acknowledgement from computing node 502A within a predetermined period after transmitting the data to the proximate device, then device 504 can transmit the data to another proximate device.

In another embodiment, device 504 transmits a ready-to-send notification to computing node 502A prior to transmitting data generated in response to signals received from sensor 506 to the computing node. If computing node 502A does not receive the data from device 504 within a predetermined time period, the computing node can interrogate device 508, as well as any other device identified by proximate devices determiner 402 as a proximate device. If a proximate device has received and cached the data, computing node 502A can instruct the proximate device to retransmit the data. Alternatively, any proximate device that has received data from device 504 can automatically transmit the data to computing node 502A after a predetermined time period. A proximate device that receives data from device 504 can retain the data in a cache until an acknowledgement of receipt of the data is received from computing node 502A. If no acknowledgement is received within a predetermined time period, the proximate device can transmit the data to still another proximate device, which can attempt to convey the data to computing node 502A. The process of receive-cache-retransmit can repeat through several iterations involving multiple proximate devices.

Data recoverer 404 of system 400 detects any failure to receive data directly from the device that generated the data. Accordingly, data recoverer 404 recognizes that data generated by device 504 is instead received at computing node 502A from proximate device 508 via communication channel 512. Data recoverer 404 tags the data to indicate that device 504 generated the data (based on signals generated by sensor 506) and stores the data in data store 406.

Optionally, data recoverer 404 can direct computing node 502A to transmit an acknowledgement to device 508 indicating receipt of the data. Data recoverer 404 can also direct computing node 502A to instruct device 508 to discard the data and clear the device's cache. Alternatively, device 508 can discard the data and clear the cache automatically after a predetermined time period following transmission of the data to computing node 502A.

If computing node 502A does not receive data from device 504 via communication channel 510, computing node 502A does not transmit an acknowledgement. (Indeed, computing node 502A need not be aware of a device's failed attempt to transmit data.) Additionally, however, computing node 502A can refrain from transmitting an acknowledgement if the computing node receives an incomplete or corrupted transmission. An incomplete transmission is one in which only a portion of the data is received by computing node 502A. A set of predefined parameters can be stored on computing node 502A and compared with any data received to thereby determine whether a complete transmission has been received or only a partial transmission. For example, if the data is generated by multiple sensors rather than sensor 506 alone, the parameters can indicate which data pertains to which of the sensors and, if data from one or more sensors is missing, the transmission of data is deemed incomplete. Accordingly, no acknowledgement is transmitted to device 504.

An error-detecting code (e.g., cyclic redundancy check, parity check, Hamming distance) can be used to determine whether a transmission received by computing node 502A, though complete, is nonetheless corrupted. If so, then computing node 502A refrains from transmitting an acknowledgement. That is, valid data may have been transmitted, but due to channel impairment or interference (e.g., fading, other randomly varying propagation conditions) may have been corrupted. If no acknowledgement is received by the transmitting device within a predetermined time period, the device transmits the data to a proximate device that can retransmit the data on an alternative channel to computing node 502A.

If data is sent from device 504 to computing node 502A in a sequence of separate transmissions, the transmissions can include an order indicator. Failure to receive a complete transmission of data from device 504 can be detected if the i-th minus one transmission and the i-th plus one transmission are received, but not the i-th transmission. Failure to receive a complete transmission of data from device 504 can also be detected if computing node 502A has prior information indicating that n transmissions are needed to convey a complete set of data. Failure to receive a complete transmission of data from device 504 can be detected if less than n transmissions are received. In either event, computing node 502A can refrain from transmitting an acknowledgement to device 504 in response to detecting a failure to receive a complete transmission of data.

In another embodiment, if a failure to receive a complete uncorrupted transmission of the data at computing node 502A is detected, then data recoverer 404 can instruct the computing node to interrogate each device identified by proximate devices determiner 402 as a proximate device (relative to the device whose transmission failed). Data recoverer 404 can direct recovery of the data from a proximate device that, as revealed by the interrogating, received and is temporarily caching the data. Data recoverer 404 can instruct computing node 502A to transmit a message to the proximate device directing the proximate device to convey the data to computing node 502A. Alternatively, the proximate device can cache the received data and retransmit the data to computing node 502A without prompting. After retransmitting the data, the proximate device can retain the data in a cache until an acknowledgement of receipt is received from computing node 502A. Again, if no acknowledgement is received within a predetermined time period, the proximate device can transmit the data to still another proximate device, which can attempt to convey the data to computing node 502A. The process of receive-cache-retransmit can repeat through several iterations involving multiple proximate devices.

In still another embodiment, data also can be recovered from a device not initially identified as a proximate device if no proximate device is available or ready to receive and retransmit the data to computing node 502A. If for whatever reason device 508 is unable to receive and retransmit data from device 504 when transmission of the data via communications channel 510 fails, and if there is no other proximate device (relative to device 504) to receive and retransmit the data, then device 504 can transmit an assist request to any other device that may be within range. The assist request is a message requesting that the other device temporarily cache and retransmit the data to computing node 502A on behalf of device 504. The request, optionally, can include an offer to compensate the other device for temporarity caching and retransmitting the data. For example, the request can specify a monetary amount and provide data needed to collect the amount in return for temporarily caching and retransmitting the data to computing node 502A. In one scenario, for example, the device is a mobile device (e.g., drone) having data caching and transmitting capabilities but not initially identified as a proximate device by proximate devices determiner 402 due to not being in-scope (e.g., initially not within transmission range of other networked devices). At the time of a request, the device may be temporarily operating in an area apart from where a transmission interruption occurred but within range of both device 504 and computing node 502A. The mobile device may thus be able to accommodate device 504's request.

In yet another embodiment, devices such as devices 504 and 506 can be monitored by a monitoring system such as cloud-based monitoring system 514. In FIG. 5C, cloud-based monitoring system 514 is communicatively coupled to computing node 502C via communication channel 516. Cloud-based monitoring system 514 can monitor devices and collect data generated by the devices based on sensor-emitted signals. The data can be transmitted by the devices to computing node 502C and relayed by the computing node to cloud-based monitoring system 514. Cloud-based monitoring system can monitor receiving device-generated data intermittently, according to a predetermined schedule, or on an ad hoc basis. If for any of the reasons described, cloud-based monitoring system 514 does not receive a complete uncorrupted rendering of data generated by any device, then the monitoring system can notify computing node 502C. Data recoverer 404 of system 400, operating on computing node 502C, can initiate the above-described data recovery operations in response to detecting the failure.

Referring still to FIG. 4, system 400 optionally can include data analytics unit 414. Data analytics unit 414 performs analytics on data captured by data recoverer 404, the data pertaining to past data transmission interruptions to determine patterns to the interruptions. Data analytics unit 414 can apply statistical methods (e.g., regression analysis) and/or machine learning (e.g., deep neural network learning algorithm) to predict future data transmission interruptions. Prediction results can be leveraged by proximate device determiner 402 to determine which devices can reliably operate as proximate devices.

Figure 6:
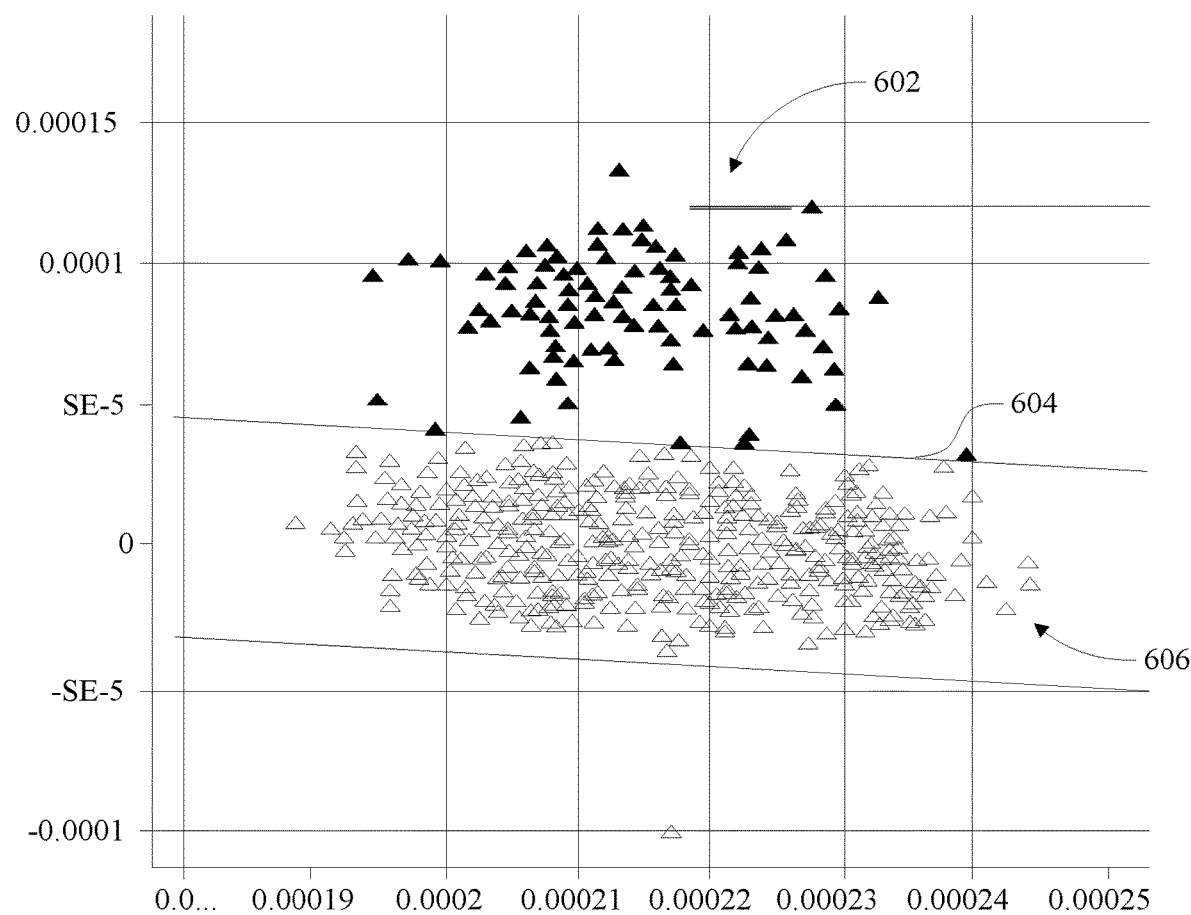
FIG. 6 is a graph of example results of a statistical analysis performed by a data validator of a system for mitigating sensor data loss according to one embodiment of the present invention.

System 400 also optionally can include data validator 416. Data validator 416 can validate cached data received via multiple communication channels (e.g., retransmission of data via different communication channels from different proximate devices) by using statistical analysis and/or machine learning to identify statistical outliers. An example result of the analysis is illustrated in FIG. 6, in which a group of identified outliers 602 are separated by statistically determined boundary 604 from valid data 606. The outliers are associated with, and thus identify, proximate devices that previously provided incorrect retransmissions or corrupted data.

Figure 7:
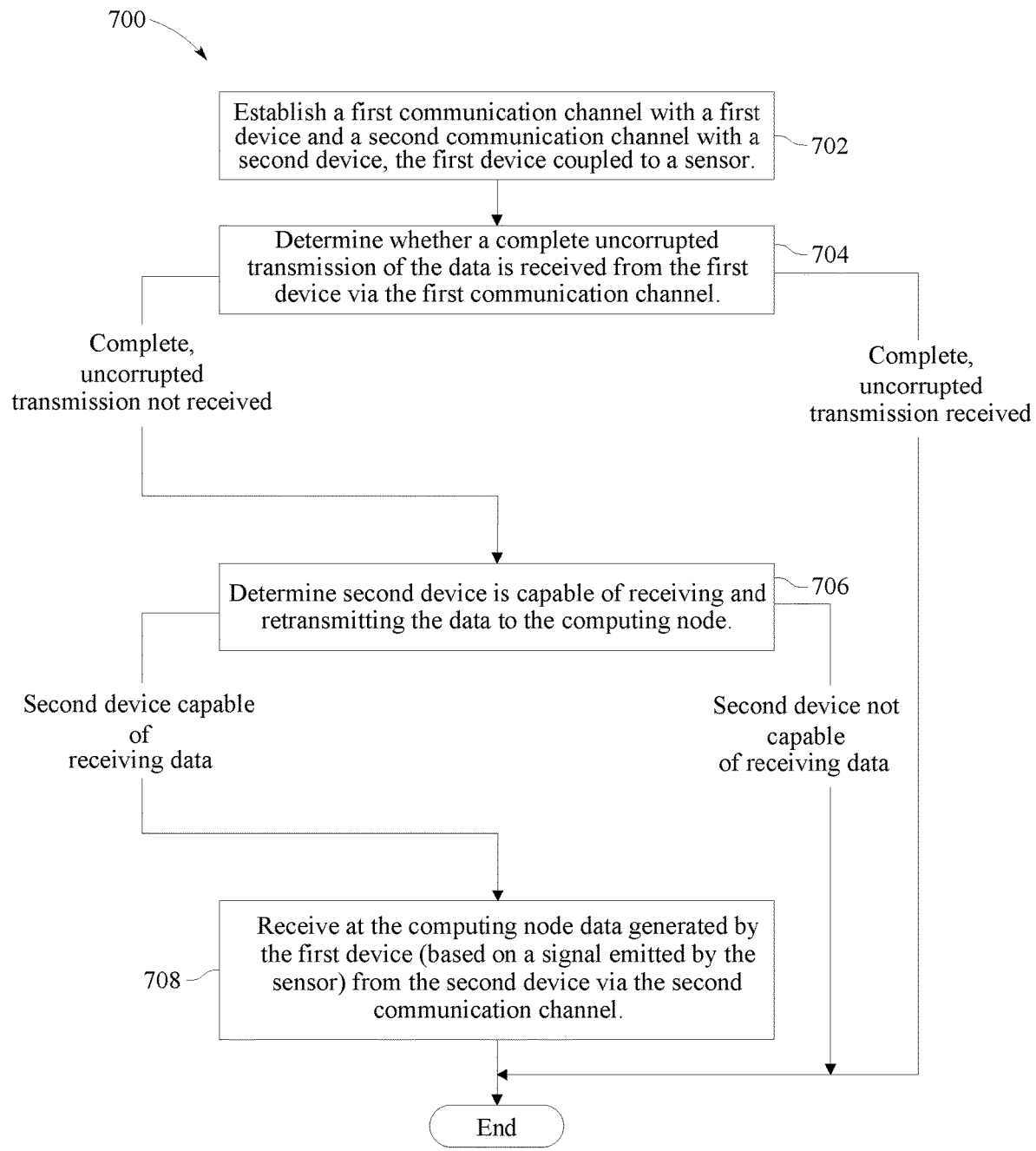
FIG. 7 is flowchart of a method for mitigating sensor data loss according to an embodiment of the present invention.

FIG. 7 is a flowchart of method 700 for mitigating sensor data loss according to one embodiment. Method 700 can be performed by a system the same as or similar to the systems described in reference to FIGS. 1-6. The method can begin with the system, at 702, establishing a first communication channel between a first proximate device and a computing node, the first proximate device operatively coupled to a sensor, and establishing a second communication channel between a second proximate device and the computing node.

The first and second proximate devices are devices that are determined to have the following properties: (1) each is within specification (e.g., satisfies network operating conditions and/or protocols); (2) each is within wireless transmission range of other within-specification devices; and (3) and each can temporarily store and retransmit data generated by another within-specification, within-range device. The devices can be part of a home personal network, enterprise-wide network, or similar type network of sensor-based devices and can communicate data (generated in response to sensor-emitted signals) to the computing node via one or more communication channels using a communication protocol (e.g., SIM 3g/4g, satellite, WiFi, Bluetooth, near-field communication). Such networked devices having the three properties described can be made proximate devices by pushing executable instructions to the devices that enable the devices to recognize and communicate with one another as proximate devices.

If data generated by the first proximate device in response to signals received from the sensor is transmitted to the computing node by the first proximate device, a determination is made at 704 as to whether a complete, uncorrupted transmission of the data is received by the computing node. A failure of the computing node to receive a complete uncorrupted transmission, according to one embodiment, is detected if after transmitting the data the first proximate device fails to receive an acknowledgement within a predetermined time from the computing node acknowledging receipt of a complete uncorrupted transmission. In another embodiment, the failure can be detected if the computing node, after receiving a ready-to-send notification from the first proximate device, fails to receive a complete, uncorrupted transmission of the data within a predetermined time period. The computing node can interrogate the second proximate device (as well as any other proximate devices) to determine whether the data was received by the proximate device.

If the data is transmitted as a sequence of transmissions, failure to receive a complete transmission of the data can be detected if the i-th minus one transmission and the i-th plus one transmission are received, but not the i-th transmission. Failure to receive a complete transmission of data can also be detected if the computing node has prior information indicating that n transmissions are needed to convey a complete set of data and less than n transmissions are received. An error-detecting code (e.g., cyclic redundancy check, parity check, Hamming distance) can be used to determine whether a transmission, though complete, is nonetheless corrupted due to channel impairment or interference due to a randomly varying propagation condition, for example.

If a failure (however detected) to receive a complete, uncorrupted transmission at the computing node via the first communication channel is detected, a determination is made at 706 as to whether the second proximate device is able to receive and retransmit the data to the computing node. If so, the data is conveyed to the second proximate device from the first proximate device, and the second proximate device retransmits the data to the computing node.

Optionally, an instruction from the computing node can be transmitted to the second proximate device instructing the second proximate device to clear the data from a cache of the second proximate device in response to receiving at the computing node a complete uncorrupted transmission of the data from the second proximate device.

In the event that a retransmission of data from the second proximate device on behalf of the first device also fails, then in response to detecting the failure, the data can be transmitted by the second proximate device to still a third proximate device. The third proximate device can attempt to transmit the data to the computing node. The process of transmit-receive-retransmit can repeat through several iterations as long as there remain other proximate devices (devices within specification and within range). Even if there are no proximate devices available, a proximate device can transmit an assist request to other devices that though not previously made proximate devices are at least temporality capable of caching and retransmitting the data to the computing node. If the request is answered affirmatively, then data is transmitted to the assisting device and retransmitted from the assisting device to the computing node.

Figure 8:
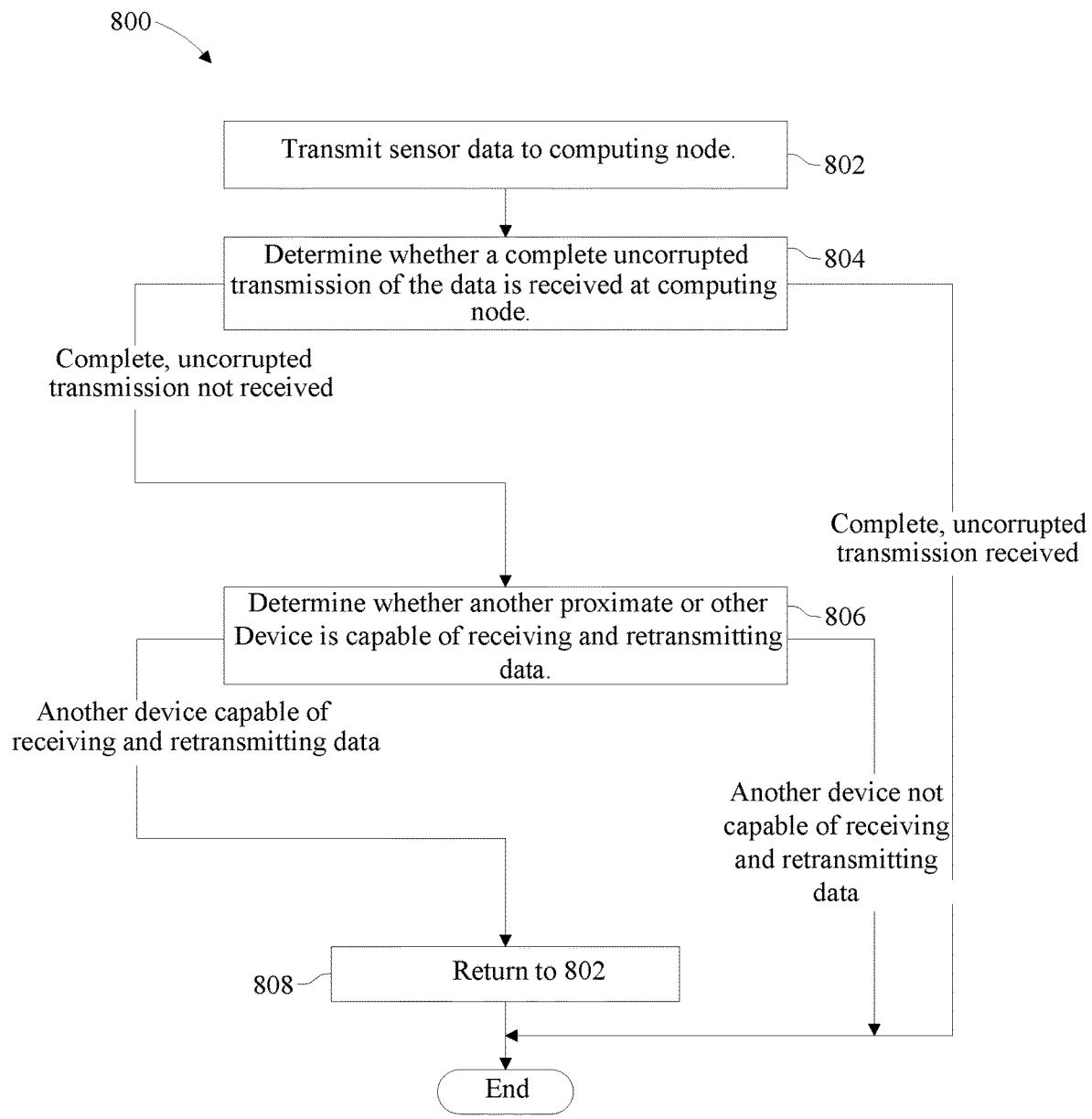
FIG. 8 is flowchart of a method for mitigating sensor data loss according to an embodiment of the present invention.

Referring additionally now to FIG. 8, the iterative process is illustrated by method 800. At 802, data is transmitted to the computing node. At 804, the determination is made whether a complete, uncorrupted transmission has been received by the computing node. If not, then at 806 another determination is made as to whether another proximate device or assisting device is available. If so, the process repeats beginning at 802. The process continues until a complete, uncorrupted transmission of the data is received by the computing node or until no other devices are available to attempt a retransmission of the data.

Additionally, methods for mitigating sensor data loss can further include analyzing prior interruptions of communication channels over which sensor data is conveyed. The data is analyzed to identify patterns to the prior interruptions. Based on analyzing the data and identifying interruption patterns, future interruptions can be predicted. Prediction results can be a basis for determining which devices can reliably operate as proximate devices. Devices, accordingly, can pre-emptively use alternative channels based on an anticipated interruption.

Mitigating sensor data loss methods also can include validating cached data received via multiple communication channels (e.g., retransmission of data via different communication channels from different proximate devices) using statistical analysis and/or machine learning to identify statistical outliers. The outliers can identify devices that introduced corrupted data.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, the phrase "if it is determined" or "if [a stated condition or event] is detected" are to be construed as "in response to determining" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   establishing, with a computing node, a first communication channel between the computing node and a first proximate device and establishing a second communication channel between the computing node and a second proximate device, wherein the first proximate device is coupled to a sensor; and
   receiving, at the computing node, data generated by the first proximate device based on a signal emitted by the sensor, wherein the first proximate device communicates the data to the second proximate device via a third communication channel and the data is received from the second proximate device via the second communication channel in response to detecting a failure to receive via the first communication channel a complete uncorrupted transmission of the data from the first proximate device and determining that the second proximate device is capable of receiving and retransmitting the data to the computing node.

2. The method of claim 1, wherein the detecting a failure to receive via the first communication channel a complete uncorrupted transmission of the data from the first proximate device includes receiving a ready-to-send notification from the first proximate device via the first communication channel and failing to receive the complete uncorrupted transmission of the data from the first proximate device within a predetermined time period.

3. The method of claim 1, further comprising interrogating the second device by the computing node in response to detecting a failure to receive via the first communication channel a complete uncorrupted transmission of the data from the first device.

4. The method of claim 1, further comprising transmitting an instruction from the computing node to the second proximate device instructing the second proximate device to clear the data from a cache of the second proximate device in response to receiving at the computing node a complete uncorrupted transmission of the data from the second proximate device.

5. The method of claim 1, further comprising transmitting the data to a third proximate device by the second proximate device in response to the second proximate device not receiving an acknowledgement that the computing node received the data from the second proximate device.

6. The method of claim 1, further comprising analyzing prior interruptions of other communication channels, identifying patterns to the prior interruptions based on the analyzing, and predicting future interruptions based on the patterns identified to determine whether the second or another device can reliably operate as a proximate device.

7. The method of claim 1, further comprising identifying a different device within transmission range of the first proximate device and receiving the data at the computing node from the different device in response to determining that the second proximate device is not capable of receiving and retransmitting the data to the computing node.

8. A system, comprising:
   a processor configured to initiate operations including:
      establishing a first communication channel between a computing node and a first proximate device and establishing a second communication channel between the computing node and a second proximate device, wherein the first proximate device operatively coupled to a sensor; and
      receiving, at the computing node, data generated by the first proximate device based on a signal emitted by the sensor, wherein the first proximate device communicates the data to the second proximate device via a third communication channel and the data is received from the second proximate device via the second communication channel in response to detecting a failure to receive via the first communication channel a complete uncorrupted transmission of the data from the first proximate device and determining that the second proximate device is capable of receiving and retransmitting the data to the computing node.

9. The system of claim 8, wherein the detecting a failure to receive via the first communication channel a complete uncorrupted transmission of the data from the first proximate device includes receiving a ready-to-send notification from the first proximate device via the first communication channel and failing to receive the complete uncorrupted transmission of the data from the first proximate device within a predetermined time period.

10. The system of claim 8, wherein the processor is configured to initiate operations further comprising interrogating the second proximate device by the computing node in response to detecting a failure to receive via the first communication channel a complete uncorrupted transmission of the data from the first proximate device.

11. The system of claim 8, wherein the processor is configured to initiate operations further comprising transmitting an instruction from the computing node to the second proximate device instructing the second proximate device to clear the data from a cache of the second proximate device in response to receiving at the computing node a complete uncorrupted transmission of the data from the second proximate device.

12. The system of claim 8, wherein the processor is configured to initiate operations further comprising receiving the data at the computing node from a third proximate device in response to the second proximate device transmitting the data to the third proximate device, the second proximate device transmitting the data to the third proximate device in response to not receiving an acknowledgement that the computing node received the data from the second proximate device.

13. The system of claim 8, wherein the processor is configured to initiate operations further comprising analyzing prior interruptions of other communication channels, identifying patterns to the prior interruptions based on the analyzing, and predicting future interruptions based on the patterns identified to determine whether the second or another device can reliably operate as a proximate device.

14. A computer program product comprising a computer readable storage medium having program instructions embodied therewith, wherein the computer readable storage medium is not a transitory, propagating signal per se, the program instructions executable by a computing node to cause the computing node to initiate operations comprising:
   establishing, by the computing node, a first communication channel between the computing node and a first proximate device and establishing a second communication channel between the computing node and a second proximate device, wherein the first proximate device operatively coupled to a sensor; and
   receiving, by the computing node, data generated by the first proximate device based on a signal emitted by the sensor, wherein the first proximate device communicates the data to a second proximate device via a third communication channel and the data is received from the second proximate device via a second communication channel in response to detecting a failure to receive via the first communication channel a complete uncorrupted transmission of the data from the first proximate device and determining that the second proximate device is capable of receiving and retransmitting the data to the computing node.

15. The computer program product of claim 14, wherein the detecting a failure to receive via the first communication channel a complete uncorrupted transmission of the data from the first proximate device includes receiving a ready-to-send notification from the first proximate device via the first communication channel and failing to receive the complete uncorrupted transmission of the data from the first proximate device within a predetermined time period.

16. The computer program product of claim 14, wherein the program instructions are executable by the computing node to cause the computing node to initiate operations further comprising interrogating the second proximate device by the computing node in response to detecting a failure to receive via the first communication channel a complete uncorrupted transmission of the data from the first proximate device.

17. The computer program product of claim 14, wherein the program instructions are executable by the computing node to cause the computing node to initiate operations further comprising transmitting an instruction from the computing node to the second proximate device instructing the second proximate device to clear the data from a cache of the second proximate device in response to receiving at the computing node a complete uncorrupted transmission of the data from the second proximate device.

18. The computer program product of claim 14, wherein the program instructions are executable by the computing node to cause the computing node to initiate operations further comprising receiving the data at the computing node data from a third proximate device in response to the second proximate device transmitting the data to the third proximate device, the second proximate device transmitting the data to the third proximate device in response to not receiving an acknowledgement that the computing node received the data from the second proximate device.

19. The computer program product of claim 14, wherein the program instructions are executable by the computing node to cause the computing node to initiate operations further comprising analyzing prior interruptions of other communication channels, identifying patterns to the prior interruptions based on the analyzing, and predicting future interruptions based on the patterns identified to determine whether the second or another device can reliably operate as a proximate device.

20. The computer program product of claim 14, wherein the program instructions are executable by the computing node to cause the computing node to initiate operations further comprising receiving the data at the computing node from a different device within transmission range of the first proximate device in response to determining that the second proximate device is not capable of receiving and retransmitting the data to the computing node.

* * * * *